United States Patent [19]

Tuckey

[11] Patent Number: 4,948,346
[45] Date of Patent: Aug. 14, 1990

[54] FUEL PUMP MOUNT FOR REDUCTION OF VIBRATION TRANSMISSION

[75] Inventor: Charles H. Tuckey, Cass City, Mich.

[73] Assignee: Walbro Corporation, Cass City, Mich.

[21] Appl. No.: 353,758

[22] Filed: May 18, 1989

[51] Int. Cl.$^5$ ............................................. F04C 29/06
[52] U.S. Cl. .................................. 417/312; 123/516; 417/423.12; 417/543
[58] Field of Search ................ 123/509, 516; 417/312, 417/366, 543, 423.12, 423.15

[56] References Cited

U.S. PATENT DOCUMENTS

| | | | |
|---|---|---|---|
| 2,459,036 | 1/1949 | Lipe et al. | 103/87 |
| 2,497,550 | 2/1950 | Jeffries | 287/53 |
| 2,807,395 | 9/1957 | Korte | 222/333 |
| 2,833,221 | 5/1958 | Dickey | 417/543 X |
| 3,330,216 | 7/1967 | Schimmelpfenig | 417/543 |
| 3,659,965 | 5/1972 | Ebert et al. | 417/363 |
| 3,775,024 | 11/1973 | Ulm et al. | 415/211 |
| 3,930,380 | 1/1976 | Fogt | 464/57 |
| 4,200,426 | 4/1980 | Linnert | 417/312 |
| 4,396,358 | 8/1983 | de Concini | 417/366 X |
| 4,571,159 | 2/1986 | Beardmore | 417/366 |
| 4,697,995 | 10/1987 | Tuckey | 418/15 |
| 4,780,063 | 10/1988 | Tuckey | 417/410 X |

Primary Examiner—Stephen M. Hepperle
Attorney, Agent, or Firm—Barnes, Kisselle, Raisch, Choate, Whittemore & Hulbert

[57] ABSTRACT

To reduce transmission of pump vibration and any out-of-balance characteristics to a pump enclosure by mounting both ends of a motor armature in a manner to absorb vibration. One end of the armature drive shaft is mounted in a flexible elongate element which accommodates to eccentric motion due to unbalance or vibration due to pump load or starting and stopping. The other end of the drive shaft is designed to move to accommodate such motion. A pump chamber can be provided around the flexible element to form a dead air dome to modulate pump pressure and collect vapor. Baffles prevent turbulence in the chamber.

5 Claims, 2 Drawing Sheets

FUEL PUMP MOUNT FOR REDUCTION OF VIBRATION TRANSMISSION

FIELD OF INVENTION

Design and mounting of electric fuel pumps used in vehicle fuel tanks to reduce transmission of vibration, noise, and unbalanced characteristics.

BACKGROUND FEATURE OF THE INVENTION

For quite some time now electric fuel pumps have been utilized to furnish hydrocarbon fuels to internal combustion engines either through carburetors, or fuel injectors, in an engine manifold. The furnishing of fuel under pressure has supplanted the vacuum systems and fuel pumps in the engine compartment and has assisted in the starting characteristics of the modern day vehicles.

The fuel pumps are quite generally mounted in the fuel tank at the rear of a vehicle. In some instances fuel canisters are used in these fuel tanks to house the fuel pump and receive fuel return flow from a pressure regulator valve in the fuel system.

The location of these pumps in a tank near or at the rear of a vehicle passenger compartment has resulted in concerted efforts to reduce the vibration and noise of an operating pump which otherwise might prove to be an annoyance to passengers.

These efforts involve mounting the pump in a manner to reduce vibration and operating noise and also careful pump design to reduce cavitation and flashback which results in pump noise. Flexible pump mounting is illustrated in a copending patent application, Ser. No. 07/312,259, filed Feb. 17, 1989 and U.S. Pat. No. 4,780,063 dated Oct. 25, 1988. Pump design is illustrated in U.S. Pat. No. 4,697,995 dated Oct. 6, 1987.

The present invention is directed to a pump design to reduce transmission of unbalance or vibration from a pump to the surrounding mount or fuel tank. Pump armatures are usually mounted on a shaft which is mounted in a sealed pump housing. An armature may sometimes be not perfectly balanced so that there is a certain amount of "run-out" as the armature rotates. In addition, starting and stopping of a pump may cause torque and side motion.

In the solution proposed by the present invention, one end of the revolving pump shaft is mounted in one end of a flexible spindle so that any run-out is absorbed by the spindle and not transmitted to the pump enclosure itself. In addition, the spindle can be contained in a dead-end chamber surrounding the spindle, the open end of the chamber being baffled and serving to modulate the pulses of the pump output.

Other objects and features of the invention will be apparent in the following description and claims in which the principles of the invention are set forth together with details to enable persons skilled in the art to practice the invention all in connection with the best mode presently contemplated for the invention.

BRIEF DESCRIPTION OF THE DRAWINGS

DRAWINGS accompany the disclosure and the various views thereof may be briefly described as.

DETAILED DESCRIPTION OF THE INVENTION AND THE MANNER AND PROCESS OF USING IT

Figure 1:
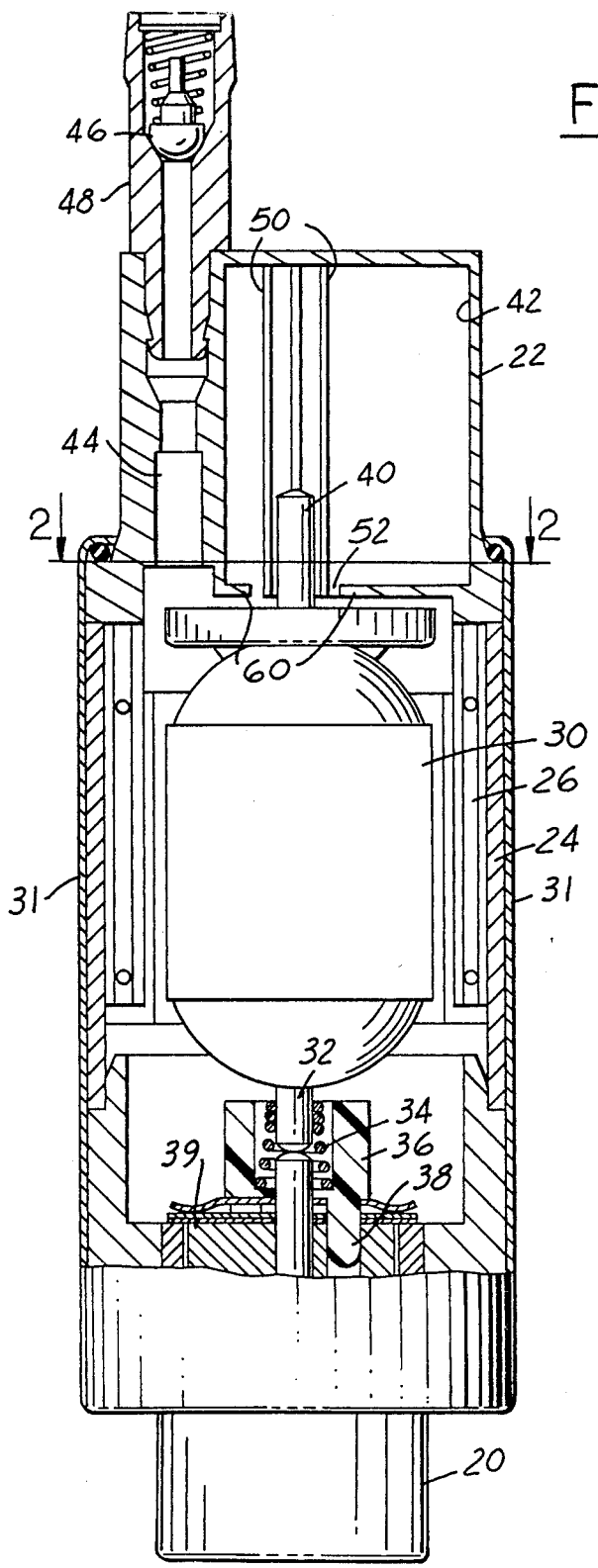
FIG. 1, a sectional view of a fuel pump showing one embodiment of the invention.

In FIG. 1, a pump assembly is illustrated having an inlet housing 20 at one end and an outlet housing 22 at the other end. Between the two housings are a flux ring 24 and semi-circular permanent magnets 26 arranged in a conventional manner around an armature chamber in which an armature 30 is rotatably mounted. The pump assembly is encapsulated in a metal shell 31, the ends of which are spun over O-ring seals. At the lower end of the armature a stub shaft 32 is secured to a tight wound tapered coil spring 34 which has a driving relationship with a drive cup 36 having axial fingers 38 extending into the rotor 39 of a fuel pump. For a positive drive the spring may have radial tangs to engage shaft 32 and drive cup 36.

The upper end of the armature 30 has a bearing shaft 40 extending into a hollow chamber 42 in outlet housing 22. This housing has a pressure outlet passage 44 leading to a spring biased outlet valve 46 in a connector 48 to which a fuel supply line will be attached. Integral with the end wall of housing 22 in chamber 42 are three depending flexible fingers 50 disposed equidistantly around a revolution axis and in contact with the shaft 40. These fingers are stiff enough to provide radial support for the shaft 40 but resilient enough to move slightly in response to eccentric "run-out" of the shaft in a manner to absorb vibration without transmitting it to the pump housing itself.

Figure 2:
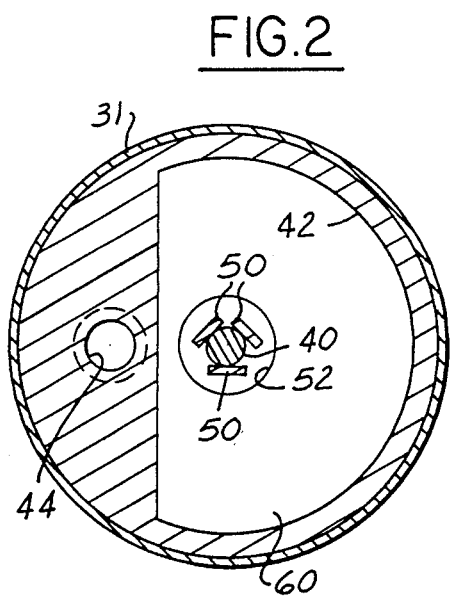
FIG. 2, a sectional view on line 2—2 of FIG. 1.

In FIG. 1, the chamber 42 is hollow and partially closed by a baffle 60 which surround the fingers 50 but is not in contact, thus providing clearance 52 (FIG. 2). The chamber 42 can be a dead air space which will provide a modulation of pump pressure pulses. This chamber can also collect vapor which will condense under the pressure of the pump output. The chamber may partially fill during extended operation but fuel will drain out when the pump is not operating. Any orbital motion of the top pump shaft will be absorbed by the spring coupling 34 at the base. Accordingly, a pump armature that may be slightly unbalanced in production runs will not transmit any vibration to the pump housing and any surrounding parts in the fuel tank in which it is submerged. In addition, the chamber 42 assists in the modulation of the pump outlet pulses.

Figure 3:
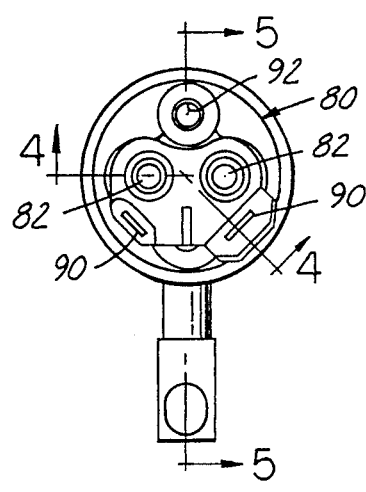
FIG. 3, an end view of a modification of the invention illustrated in FIGS. 4 to 7.
Figure 4:
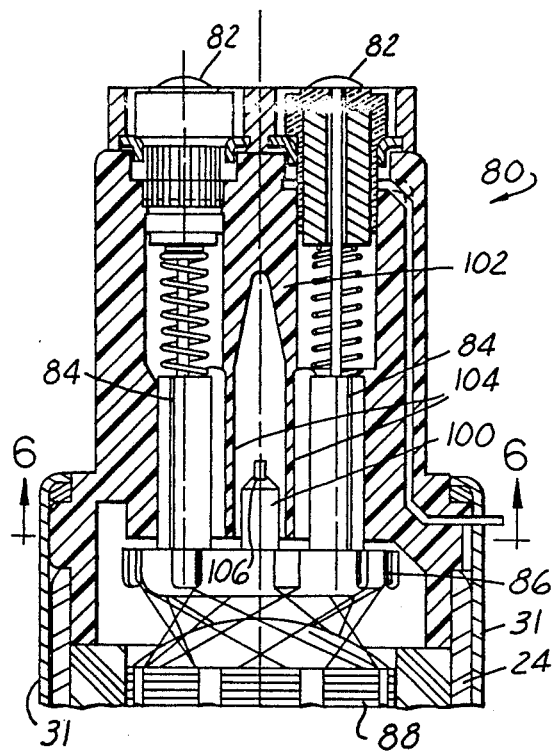
FIG. 4, a sectional view on line 4—4 of FIG. 3.
Figure 5:
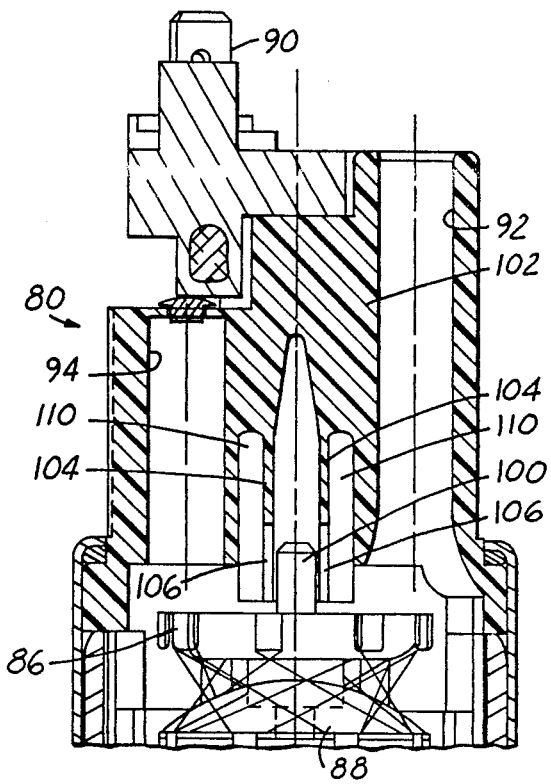
FIG. 5, a sectional view on line 5—5 of FIG. 3.
Figure 6:
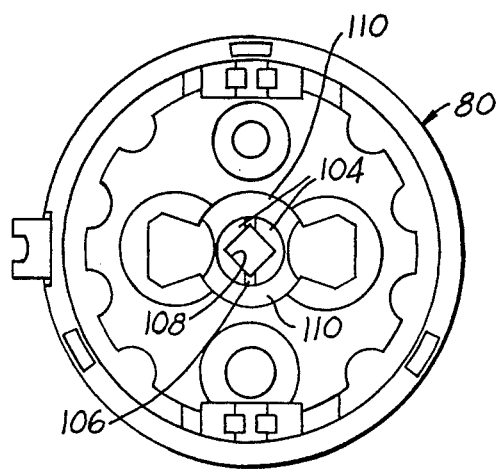
FIG. 6, a sectional view on line 6—6 of FIG. 4.
Figure 7:
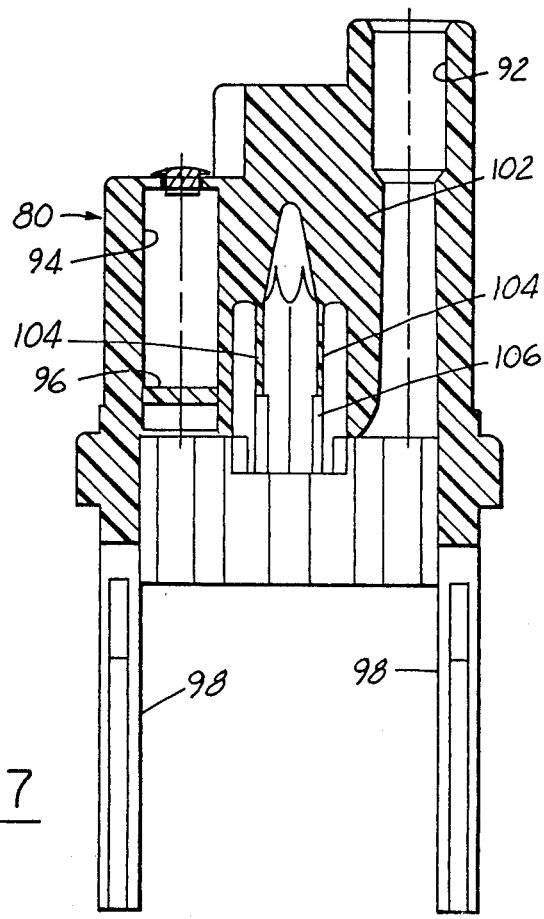
FIG. 7, a sectional view of one end of the pump housing with the armature removed.

In FIGS. 3 to 7, a modified embodiment of the invention is disclosed. In this embodiment, only the outlet housing is illustrated. In FIG. 3, an end view shows the outlet housing 80 with caps 82 covering brush recesses which contain brushes 84 resiliently biased against a commutator plate 86 at the end of an armature 88 as shown in FIG. 4. Electrical connectors 90 put the electric motor in a control circuit. FIGS. 5 and 7 show a section of the outlet housing 80 taken on line 5—5 of FIG. 3. A fuel outlet 92 may have an outlet valve as shown at 46 in FIG. 1 and will be in the fuel circuit leading to the engine. A passage 94 can receive a special relief valve or a vapor escape valve which closes in response to liquid or be blocked at 96 as shown in FIG.

7. Extensions 98 locate and separate the field magnets around the armature.

Extending from the commutator plate 86 is a stub shaft 100. Centrally of housing 80 is a core element 102 which houses the brushes 84 and has also a central opening formed by spaced flexible fingers 104 cut out at 106 to form a diamond or square shaped recess 108 (FIG. 6). The four sides of the recess will bear against the shaft 100 and support it in the housing in the same manner as the flexible fingers 50 of FIG. 1. The other end of the armature can be mounted as shown in FIG. 1. The depending fingers are each flanked by dead-end chambers 110.

Thus, each embodiment shows one end of an armature shaft mounted between cantilevered flexible fingers which will yield in response to imbalance or start-up or stop-motion but maintaining the pump in stable rotational position. Thus, vibration and imbalance will not be transferred to the pump housing on the fuel tank supports.

What is claimed is:

1. An electrically driven fuel pump for installation in a fuel tank of a vehicle which comprises:
    (a) a pump housing to be mounted in a vehicle fuel tank and having a fuel inlet and a fuel outlet,
    (b) a motor armature for rotation in said housing between said inlet and said outlet,
    (c) a rotary pump adjacent said inlet to be driven by said armature,
    (d) first means rotatably connecting an axis shaft on one end of said armature to said rotary pump, and
    (e) a second means for mounting the other end of an axis shaft of said armature comprising elongate flexible means depending from one end of the interior of said housing having an interior recess to radially capture said other end of said axis shaft, whereby said second means will flex to accommodate eccentric motion of said armature due to vibration and unbalance without transfer of said motion to said housing.

2. A device as defined in claim 1 in which said first means comprises a coil spring engaging said axis shaft at one end and a coupling element on said pump at the other end, said spring allowing motion of said axis shaft due to off-center action of said shaft.

3. A device as defined in claim 1 in which said second means comprises three resilient leaf with proximal ends mounted on an end of said housing and the distal ends surrounding said other end of said axis.

4. A device as defined in claim 1 in which a chamber is formed on said housing surrounding said elongate flexible means, and baffle means at the base of said chamber having an opening to receive ends of said flexible means and said other end of said axis shaft, said chamber serving to enclose a dead air space to modulate pump outlet pulses and collect vapor for condensation in the presence of pump outlet pressure.

5. A device as defined in claim 1 in which said pump housing includes a molded plastic outlet end having said depending means having proximal ends molded integrally with said outlet end and comprising split distal ends surrounded by dead end chambers with the open end exposed to the interior of said pump housing.

* * * * *